United States Patent [19]

Strickland

[11] Patent Number: 4,649,663
[45] Date of Patent: Mar. 17, 1987

[54] FISHING SINKER

[76] Inventor: Richard C. Strickland, P.O. Box 1136, LaBelle, Fla. 33935

[21] Appl. No.: 706,780

[22] Filed: Feb. 28, 1985

[51] Int. Cl.⁴ ............................................. A01K 95/00
[52] U.S. Cl. .................................................... 43/44.9
[58] Field of Search ................... 43/44.9, 42.24, 42.39, 43/43.14

[56] References Cited

U.S. PATENT DOCUMENTS

| | | | |
|---|---|---|---|
| 2,140,724 | 12/1938 | Stefan | 43/44.9 |
| 2,473,089 | 6/1949 | Barone | 43/44.9 |
| 3,096,599 | 7/1963 | Baron | 43/44.9 |
| 3,803,749 | 4/1974 | Boyum | 43/44.9 |
| 3,983,656 | 10/1976 | Bain | 43/42.24 |
| 4,167,076 | 9/1979 | Weaver | 43/42.24 |

Primary Examiner—M. Jordan
Attorney, Agent, or Firm—Alfred E. Wilson

[57] ABSTRACT

I have found that a very desirable arrangement with reference to a slip sinker slidably mounted on a line consists of a length of pliable plastic material extending through and secured to an elongated tapered body. The line extends through this plastic sleeve and the line is free to move within the sinker. The plastic sleeve extends completely through the sinker and projects a short distance of 1/32 of an inch on opposite sides thereof so that the line can freely move through the plastic liner without being frayed or abraded which could weaken the line.

1 Claim, 4 Drawing Figures

FISHING SINKER

BACKGROUND OF THE INVENTION

In situations where it is desirable to employ slip sinkers in the art of fishing, difficulties have been experienced because the slip sinkers heretofore used had roughened edges or abrupt corners which could abrade or fray the edge of the line as it slid through the sinker. This is particularly true where monofilament lines are employed.

FIELD OF THE INVENTION

My invention is directed to the provision of a slip fishing sinker having a plastic sleeve extending therethrough, and in which the line is free to shift longitudinally through the sinker, and the line is maintained out of contact with the alloy of which the sinker is formed and contacts only the soft plastic liner projected through the sinker.

SUMMARY OF THE INVENTION

The invention consists of a slip sinker having a plastic sheath extending therethrough and in which the fishline is free to slide through the sinker and is encased in a plastic insulated sheath so that the line is never subjected to the roughened or abrasive material of which the sinker is formed.

DESCRIPTION OF THE PREFERRED EMBODIMENT

Figure 1:
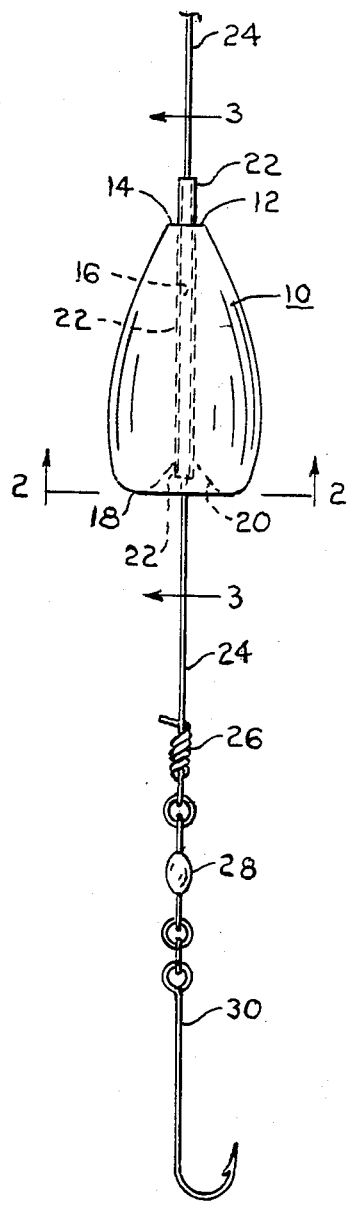
FIG. 1 is a side elevational view of a fishing sinker and line embodying the present invention.
Figure 2:
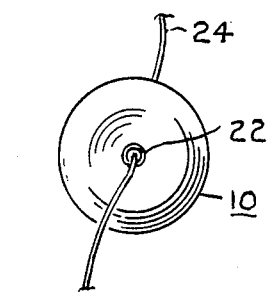
FIG. 2 is a bottom plan view of the sinker, taken on the line 2—2 of FIG. 1 looking in the direction of the arrow.
Figure 3:
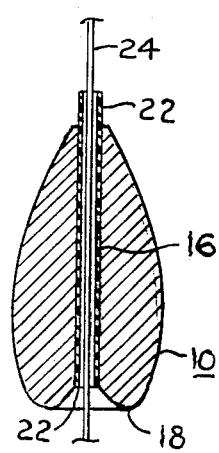
FIG. 3 is a sectional view through the sinker showing the plastic sleeve in place therein.

Referring now to the drawings a slidable sinker 10 formed of lead or other suitable alloy is preferably shaped with an elongated tapered body section terminating at the forward end 12 with an elongated tapered section reduced to substantially zero diameter 14 with reference to an aperture 16 extending longitudinally through the sinker 10 and terminating at the rear end 18 at a slightly reduced radial curvature at the juncture with a conical recess 20 extending radially inwardly to the longitudinal aperture 16 extending throughout the sinker.

A plastic sleeve 22 extends longitudinally in the aperture 16 and, as illustrated in FIG. 1 extends a short distance beyond the forward end 12 and a short distance beyond the aperture 16 in the rear end of the sinker 10. A fishline 24 formed of any desired fishline material such as nylon or monofilament extends through the plastic sleeve 22, and is freely slidable therethrough. It will be noted that the knot 26 or other connector by which the line is secured to a swivel 28 and a hook 30 or other bait having a hook therein will extend into the conical recess 20 when the line is positioned vertically as shown in FIG. 1 to partially screen the tie 26 from the fish. The swivel 28 of course performs its usual function of permitting the line 24 and hook 30 to rotate relative to each other to avoid entangling the line.

The plastic sleeve 22 may be formed of any suitable plastic material similar to the plastic sheath used to insulate electrical lines.

The sinker 10 may if desired be cast with the aperture 16 in place by providing a mold of the desired shape of the sinker and having a removable core piece extending from the forward end 12 to the rear end 18 which remains in place when molten alloy is introduced into the mold to form the sinker, and wherein the core is withdrawn axially when the alloy has solidified to a sufficient degree that the aperture 16 will not close up.

It will also be understood that if desired the sinker embodying the desired shape may be cast solid and individual sinkers may be drilled longitudinally in a drill press or other suitable mechanism to provide the aperture 16 therein.

The aperture 16 is preferably of a diameter to provide a snug slip fit with respect to the plastic sleeve 22 so that when installed the plastic sleeve will not slip out. It will be understood that if desired the outer surface of the plastic sleeve 22 may be treated with a suitable glue or other sticky or tacky substance to insure that the sleeve 22 will be securely fastened in the aperture 16 of the sinker 10.

Figure 4:
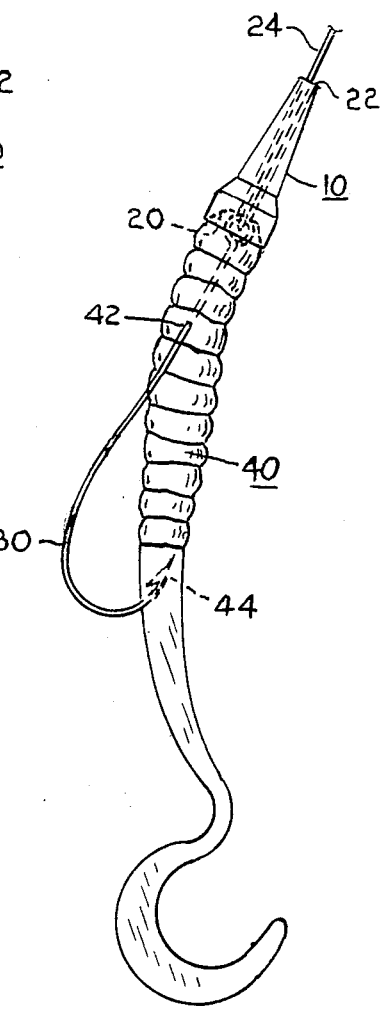
FIG. 4 is a side elevational view showing a worm type bait and hook assembled with a slip type sinker.

In the embodiment of my invention illustrated in FIG. 4 a worm type bait 40 has a rounded frontal end which projects into the conical recess 20 in the rear end of the sinker 10 so that the sinker 10 and the bait 40 appear to the fish as a continuous bait or lure to attract fish.

The fishline 24 extends through the plastic sleeve 22 in the sinker 10 and through the central forward end of the worm type bait 40. The line 24 extends through the body of the bait 40 and emerges through the side at 42 thereof, and is secured to the upper end of the hook 30. The barb end 44 of the hook 30 is preferably projected into the body of the bait 40 to provide a so-called weedless lure because the barb of the hook remains concealed in the bait 40 until a fish strikes the bait 40 and forces the hook to project through the bait to catch the fish.

Where this slip sinker is used in combination with a plastic worm or other bait where the head or the front end of the bait projects into the conical recess 20 of the sinker 10, the slip sinker and the head of the bait blend into each other and the sinker appears as an integral part of the bait.

In use when the fisherman wishes to use the method of fishing referred to as, "bottom fishing", he casts or reels out a sufficient length of line 24 to reach the bottom of the water, and to permit a length of the line to lay on the bottom so that tension is not applied to the line pulling it through the sinker 10. If there is a slight degree of current flow in the water the resistance of the water on the bait and hook 30 will pull the line 24 through the sinker 10 so that the bait and hook will be separated a short distance from the sinker 10.

When a fish becomes interested in the bait, regardless of whether the bait is close to the sinker or not, and the fish picks up the bait in his mouth, the line 24 will slide freely through the sinker so that virtually no resistance will be felt by the fish on the line and hook. By the time the fish swims off a short distance with the bait in his mouth the weight of the sinker will be picked up, and a tug will be exerted on the line. The fisherman will realize that he, "has a bite" either by the pull on the line 24 or by a float secured to the line being submerged. The fisherman will then pull the line to set the hook. Many fishermen are of the opinion that with this type of fishing they catch a greater number of fish than when fishing with the sinker secured to the line.

I claim:

1. A hollow longitudinally apertured slip sinker having an elongated tapered body reduced at one end to zero diameter with reference to the longitudinal aperture through the sinker and having an arcuately tapered body section terminating at the other end in a concave depression having the longitudinal aperture through the sinker as the center of the concave depression, a flexible hollow plastic sleeve similar to the plastic sheath used to insulate electrical lines adhesively secured in the longitudinal aperture in the body of the sinker for permanent installation therein, and having end portions projecting in opposite directions approximately 1/32 of an inch beyond the confines of the opposite ends of the sinker, the hollow plastic sleeve of the sinker being adapted to receive a fishline slidably mounted through the sleeve and free to move longitudinally therethrough and being protected by the plastic sleeve from abrasion with the body of the sinker.

* * * * *